Jan. 24, 1950   R. A. PETERSON ET AL   2,495,544
PIPE WELDING AND MAGNETIC TESTING APPARATUS
Filed Sept. 6, 1946   2 Sheets-Sheet 1

Inventors
ROBERT A. PETERSON
DOLPH F. HECKLE
JOHN E. CLARKE

Attys.

Jan. 24, 1950 R. A. PETERSON ET AL 2,495,544
PIPE WELDING AND MAGNETIC TESTING APPARATUS
Filed Sept. 6, 1946 2 Sheets-Sheet 2
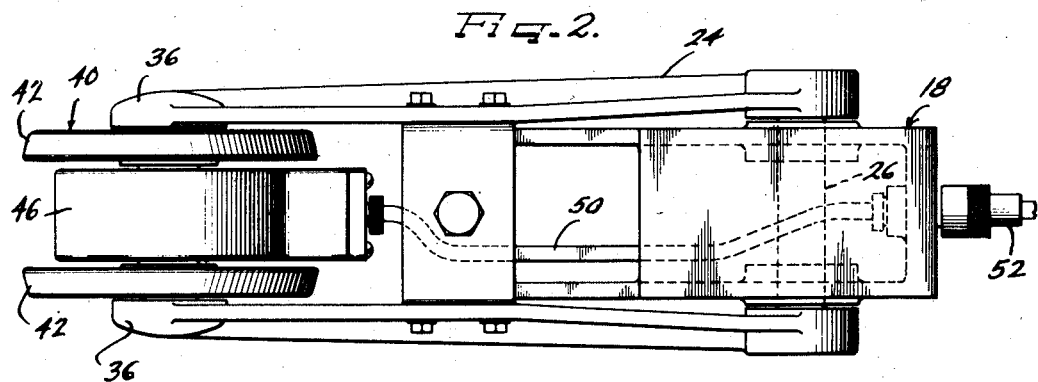
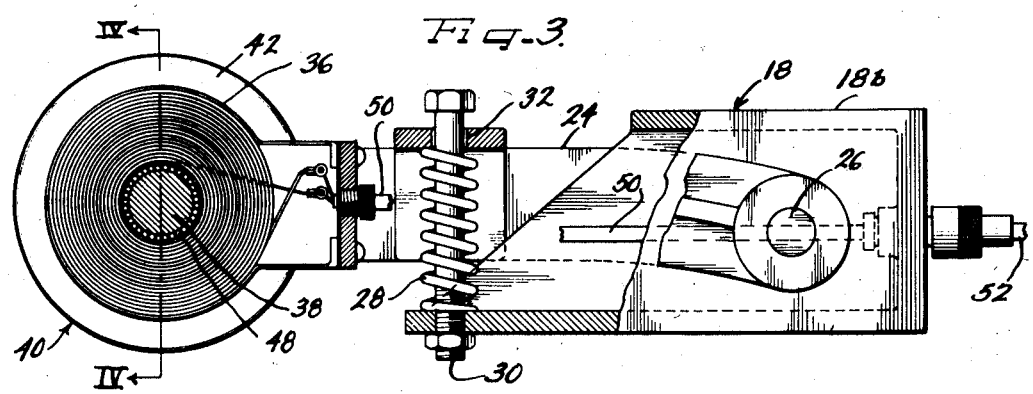
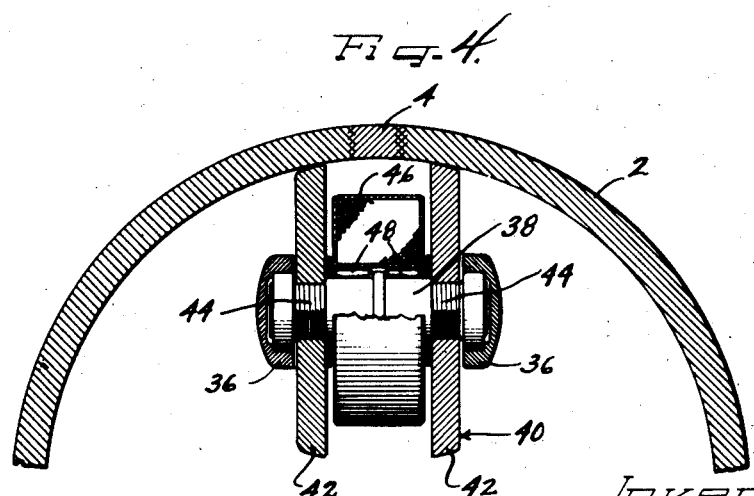
Inventors
ROBERT A. PETERSON
DOLPH F. HECKLE
JOHN E. CLARKE Patented Jan. 24, 1950

2,495,544

UNITED STATES PATENT OFFICE 2,495,544

PIPE WELDING AND MAGNETIC TESTING APPARATUS

Robert A. Peterson, Dolph F. Heckle, and John E. Clarke, Chicago, Ill., assignors to Magnaflux Corporation, Chicago, Ill., a corporation of Delaware Application September 6, 1946, Serial No. 695,188

3 Claims. (Cl. 113—59)

This invention relates to magnetic inspection methods and apparatus and paricularly to methods and apparatus for magnetically inspecting a longitudinally welded joint on pipes or similar members concurrently with the production of such welds.

Large quantities of ferrous pipes are now produced by economical manufacturing processes essentially comprising the forming of the pipe material into a generally circular cross-sectional configuration and then securing the abutting edges of the pipe forming material by a longitudinal weld. In such methods of fabrication of pipe, it is obvious that the bursting strength and leakproof properties of the pipe are primarily determined by the quality of the longitudinal weld. The application of magnetic particle inspection methods to such longitudinal welds offers a convenient, inexpensive process for determining the quality of the weld; however, the magnetic particle inspection methods and apparatus heretofore known could not be conveniently applied to longitudinal pipe welds because of the obvious difficulty, due to the shape of the pipe, of establishing a magnetic field in the joint portion of the pipe and of supplying a suitable layer of magnetic particles to the magnetized joint portion to permit magnetic particle inspection of the quality of the weld to be accomplished by the customary visual inspection methods.

Accordingly, it is an object of this invention to provide improved methods and apparatus for conveniently and economically effecting the magnetic particle inspection of a longitudinal portion of an elongated ferrous testpiece.

A particular object of this invention is to provide improved methods and apparatus for effecting magnetic particle inspection of the longitudinally welded joint of a welded pipe or similar article, and particularly, to effect such inspection concurrently with the production of the longitudinal weld.

Another object of this invention is to provide an improved apparatus for supplying a magnetic field to a longitudinal portion of a tubular testpiece, and accomplishing such application on the inside surface of the testpiece.

A particular object of this invention is to provide an improved magnetizing head adapted for applying a magnetic field to the interior surface of a longitudinal portion of a tubular testpiece.

Another object of this invention is to provide an improved magnetizing head supporting arrangement adapted for cooperation with a welding head for effecting a weld of a longitudinal joint on pipe or a similar member, characterized by the fact that the magnetizing head is supported interiorly of the pipe and in engagement with the interior surface of the welded joint by a support arm which passes through the exterior of the pipe through the unwelded portion of the joint.

The specific nature of the invention as well as other objects and advantages thereof will become apparent to those skilled in the arts from the following detailed description and the annexed sheets of drawings which, by way of preferred example only, illustrate one specific embodiment of the invention.

On the drawings:

Figure 2 is a top elevational view of the magnetizing head utilized in the apparatus of Figure 1;

Figure 3 is a side elevational view, partly in section, of the magnetizing head of Figure 2; and Figure 4 is a partial vertical sectional view taken on the plane 4—4 of Figure 3 and illustrating the cooperation between the magnetizing head and the internal surface of the pipe.

As shown on the drawings:

Figure 1:
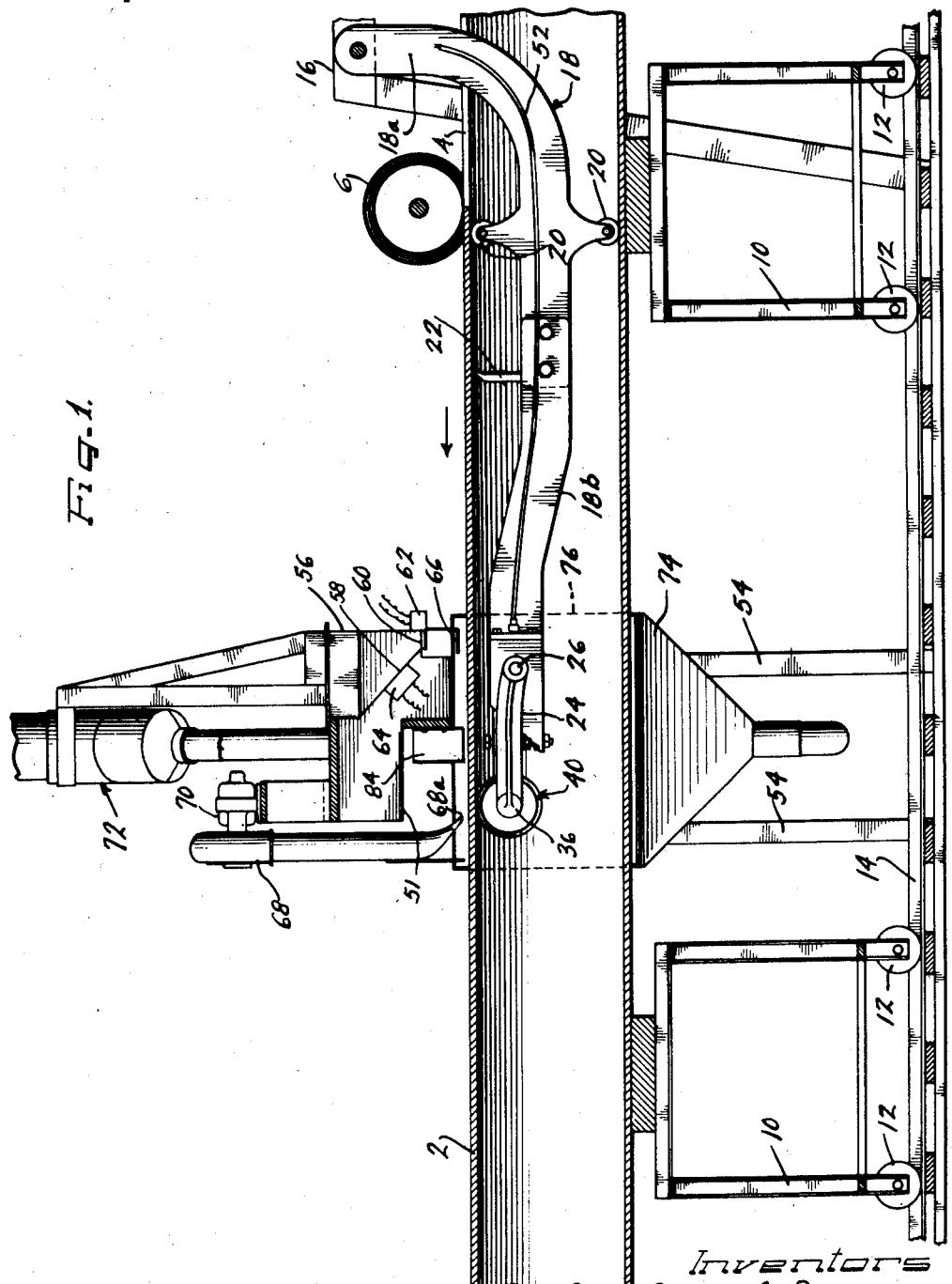
Figure 1 is a front elevational view, partly in section, of a combined welding and magnetic inspection apparatus embodying this invention, illustrating the application of such apparatus to effect magnetic particle inspection of a longitudinally welded joint of a pipe concurrently with the welding operation.

While this invention has been illustrated as applied to effecting magnetic particle inspection of a longitudinal pipe joint weld concurrently with the welding thereof, it is to be understood that such represents merely a specific application of this invention and that the principles thereof may be readily applied to effecting magnetic particle inspection of any longitudinal testpiece, and particularly tubular testpieces.

Referring to the drawings, testpiece 2 is illustrated as comprising a pipe having abutting edges thereof defining a longitudinal joint 4 which is welded by moving the pipe longitudinally past a welding head 6, here illustrated as comprising a welding wheel. It should be understood that the welding head 6 may comprise any one of several well-known forms and the specific construction thereof forms no part of this invention.

The pipe 2 is supported for longitudinal movement in any conventional manner, such as by a plurality of carriages 10 which have wheels 12 movable along a suitable track 14. Preferably some form of driving mechanism (not shown) is provided for effecting longitudinal movement of pipe 2 at a uniform rate past the welding head 6. The pipe is moved from right to left as viewed in Figure 1.

At a point relatively ahead of welding head 6, and hence adjacent the unwelded portion of the joint 4, an upstanding frame 16 is provided which is fixed with respect to the welding head 6. Frame 16 supports a radial arm portion 18a of a support arm 18 which has a longitudinal portion 18b insertable within the interior of the pipe 2. At a point adjacent the welding head 6, the support arm 18 preferably journals a plurality of pressure rollers 20 which have a rolling engagement with the interior surface of the moving pipe 2 and assist in holding the edges forming joint 4 of such pipe in proper relationship with respect to welding head 6.

If desired, a scraper 22 may also be mounted on support arm 18 at a point behind the welding head 6 and engageable in scraping relation with the interior surface of the welded joint accomplished by the welding head 6 to remove flash, scale and other deleterious substances from the surface.

On the end of the inserted longitudinal arm portion 18b of support arm 18, a bearing carrying arm 24 is pivotally mounted on a pin 26. Suitable resilient means are provided for resiliently urging the bearing carrying arm 24 outwardly with respect to support arm 18. Such resilient means may conveniently comprise a helical spring 28 which is mounted in surrounding relationship upon a bolt 30 which has the shank end thereof secured in the support arm 18 and the head end of the shank passing through aperture 32 in bearing carrying arm 24.

The free end portion of the bearing carrying arm 24 defines a pair of spaced, opposed bearings 36 which respectively journal the ends of a shaft 38 of a roller member 40.

Roller member 40 comprises a built-up member formed by the suitable assembly of large diameter flanges 42 upon a roller shaft 38. Flanges 42 may be press fitted on such shaft or threaded on spaced threaded portions 44 on the roller shaft 38. The peripheral surfaces of flanges 42 are suitably shaped to permit such flanges to achieve a rolling engagement with the interior surface of the pipe 2, preferably on each side of the welded joint 4.

In the central space defined on roller member 40 between flanges 42 a magnetizing coil 46 is mounted, the axis of coil 46 being substantially coaxial with that of roller member 40. Preferably the coil 46 is rotatably journalled on the central portion of roller shaft 38 by needle bearings 48. Hence, as the roller member 40 rotates due to the relative movement of the pipe 2, the magnetizing coil 46 may remain stationary. Such an arrangement greatly facilitates the supply of magnetizing current to coil 46 inasmuch as the current may be supplied without the necessity of slip rings, such as by conductor 50. Conductor 50 is suitably connected to a cable 52 which is mounted on support arm 18 and follows the radial portion 18a of support arm 18 to the exterior of pipe 2 at which point it is connected to a suitable source of magnetizing current (not shown).

The outwardly directed bias maintained on the bearing carrying arm 24 by the spring 28 insures that the peripheral portions of the roller member 40 will be maintained in good contacting relationship with the interior surface of the pipe 2 at areas immediately adjacent each side of the welded joint 4. Accordingly, the application of magnetizing current to magnetizing coil 46 will produce a substantial magnetic field traversing the longitudinal welded joint 4. Such magnetic field may be conveniently utilized for magnetic particle inspection of the weld joint 4.

It will be noted that the magnetizing head or roller member 40 is positioned by the support arm 18 at a point a substantial distance behind the welding head 6 with respect to the direction of movement of the pipe 2. It is thus assured that the welded joint 4 will have cooled to a temperature suitable for magnetic particle inspection.

While any arrangement might be utilized to deposit a layer of magnetic particles on the exterior surface of the magnetized portion of the pipe 2, we preferably utilize apparatus described and claimed in our copending application Serial No. 695,189, filed on even date herewith.

Adjacent to the magnetizing head 40, an upstanding frame unit 51 is provided comprising generally upright channel members 54 disposed in surrounding relationship to the path of the pipe 2. A hopper 56 is supported on the frame 51 and has an inclined bottom surface 58 sloping downwardly to a discharge opening 60 controlled by a solenoid operated valve 62. Hopper 56 is constructed to contain a supply of magnetic particles of the type utilized in the well-known magnetic particle inspection method. The discharge opening 60 of hopper 56 is disposed in overlying relationship to the longitudinal portion of the testpiece which is to be magnetically inspected, in this case overlying the welded joint 4. Discharge opening 60 is preferably disposed somewhat in front of the magnetizing head 40 and, of course, rearward of the welding head 6 with respect to the direction of movement of the pipe 2. To insure a uniform flow through the discharge opening 60, we preferably provide an electromagnetic vibrating unit 64 which is secured to the inclined bottom surface 58 of hopper 56. A screen 66 may be provided in underlying relationship to discharge opening 60 to break up the stream of magnetic particles falling from the hopper and cause a uniform layer of powder to be applied to the pipe 2. Thus a layer of magnetic particles of substantially uniform thickness is deposited upon the external surface of the welded joint 4.

At a point adjacent to, and here shown as immediately rearward of the position of the magnetizing head 40, a nozzle outlet 68a of a blower 68 is positioned in overlying relationship to the path of the welded joint 4. Blower unit 68 may be driven by a suitable motor 70. At this location of the blower nozzle 68, the magnetic field produced by magnetizing head 40 is of strongest intensity and accordingly the magnetic particles lying immediately upon the surface of the pipe 2 will arrange themselves on such surface in patterns which provide an indication of the existence of any defect in the magnetized portion of the pipe. The blower 68 functions to remove excess magnetic particles not held by defects in the testpiece and is purposely of such intensity as to not disturb the particles held by the defects.

A particle collecting blower unit 72 is provided having casing portion 74 disposed on each side of the path of the pipe 2 and having inlet mouths 76 suitably shaped so as to substantially surround the pipe 2. Thus all of the excess particles blown off the pipe 2 by the action of the blower unit 68 are drawn into the inlet mouths 76 of the collecting blower unit 72 and collected for reuse.

Preferably a vertical baffle member 84 is provided intermediate the blower nozzle 68a and the hopper discharge opening 60 to prevent the air discharged by the blower nozzle from adversely influencing the flow of the magnetic particles out of the discharge opening 60 of the hopper and onto the external surface of the welded joint 4.

The operation of the method and apparatus constituting this invention will be obvious to those skilled in the arts from the foregoing description. When the layer of magnetic particles which are retained on the external surface of the welded joint 4 by the magnetic field produced by magnetizing head 40 pass beyond the blower nozzle 60, they may be readily observed and the physical configurations thereof noted by the observer as an indication of the existence of any defect in the welded joint 4 in accordance with the conventional methods of magnetic particle inspection.

The apparatus embodying this invention therefore provides convenient and reliable magnetization of a longitudinal joint on a tubular member and such magnetization may be accomplished concurrently with the welding of such joint. The outstanding convenience and economy of combined operation of the welding and magnetic inspection procedures is obvious.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. Apparatus for magnetizing ferrous pipe or the like comprising a fixed support arm having one end adapted for insertion into a pipe, means adapted for longitudinally moving the pipe relative to said support arm, a bearing carrying arm pivotally mounted on the inserted end of said support arm, a roller member journalled on said bearing carrying arm, resilient means urging said bearing carrying arm outwardly, whereby said roller member is resiliently held in engagement with the internal surface of the moving pipe, a magnetizing coil circumferentially wound around a portion of said roller member, and means for supplying current to said magnetizing coil, whereby a magnetic field is established in the longitudinal portion of the pipe passing adjacent said roller member.

2. A longitudinal seam pipe welding and testing apparatus comprising, in combination, a fixed position welding head, means adapted for moving a pipe having a longitudinal joint therein past said welding head to weld the longitudinal joint, a support arm having a longitudinal end portion adapted for insertion in the pipe and a radial portion adapted to project through the longitudinal joint of the pipe at a point ahead of said welding head with respect to the direction of movement of the pipe, fixed means exterior of the pipe for supporting said radial portion of said support arm, a roller member journalled on the inserted end of said support arm, said roller member having peripheral portions thereof engageable with the internal surface of the longitudinal joint at a point relatively behind said welding head with respect to the direction of movement of the pipe, a magnetizing coil circumferentially wound around a portion of said roller member, and means for supplying current to said magnetizing coil, whereby a magnetic field is established in the longitudinal welded joint of the pipe.

3. A longitudinal seam pipe welding and testing apparatus comprising, in combination, a fixed position welding head, means adapted for moving a pipe having a longitudinal joint therein past said welding head to weld the longitudinal joint, a support arm having a longitudinal end portion adapted for insertion into the pipe and a radial portion adapted to project through the longitudinal joint at a point ahead of said welding head with respect to the direction of movement of the pipe, means for securing said radial portion outside said pipe, a bearing carrying arm pivotally mounted on the inserted arm of said support arm, a roller member journalled on said bearing carrying arm, resilient means urging said bearing carrying arm outwardly, whereby the peripheral portions of said roller member are resiliently held in engagement with the internal surface of the longitudinal joint, a magnetizing coil circumferentially wound around a portion of said roller member, and means for supplying current to said magnetizing coil, whereby a magnetic field is established in the longitudinal joint of the pipe.

ROBERT A. PETERSON.
DOLPH F. HECKLE.
JOHN E. CLARKE.

REFERENCES CITED

The following references are of record in the file of this patent:

UNITED STATES PATENTS

| Number | Name | Date |
| --- | --- | --- |
| 1,635,536 | Butler | July 12, 1927 |
| 1,685,965 | Spooner | Oct. 2, 1928 |
| 1,872,351 | Schaake et al. | Aug. 16, 1932 |
| 1,895,643 | Putnam | Jan. 31, 1933 |
| 1,912,569 | Drake | June 6, 1933 |
| 2,065,118 | Davis | Dec. 22, 1936 |
| 2,100,502 | Campbell et al. | Nov. 30, 1937 |
| 2,124,579 | Knerr et al. | July 26, 1938 |
| 2,268,368 | Anderson | Dec. 30, 1941 |
| 2,309,343 | Farrow | Jan. 26, 1943 |